Patented Mar. 7, 1950

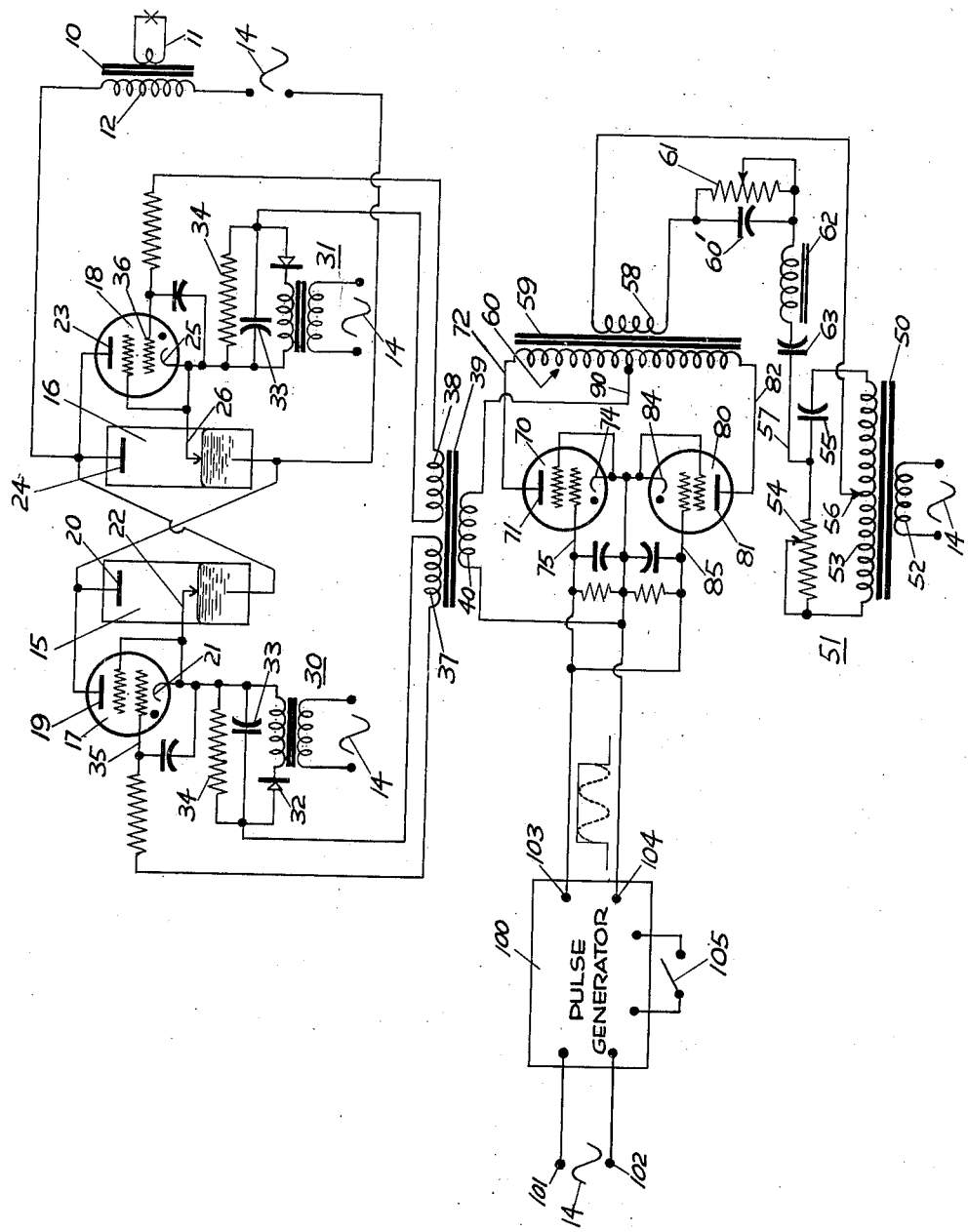

2,499,730

UNITED STATES PATENT OFFICE 2,499,730

CONTROL CIRCUITS

John W. Dawson, West Newton, and Donald P. Faulk, Waltham, Mass., assignors to Raytheon Manufacturing Company, Newton, Mass., a corporation of Delaware Application March 11, 1947, Serial No. 733,902

15 Claims. (Cl. 315—246)

This invention relates to control circuits or switching systems in general and more particularly to such systems useful for application to resistance welding systems of the alternating current type.

It is an important object of this invention to provide an improved control circuit adapted for use with such type of resistance welding systems, the control circuit having means for accurately predetermining the total amount of welding current to be passed through the welding transformer primary in any one welding operation.

It is also an object of the invention to provide an improved circuit arrangement to permit adjustable and predetermined delayed firing of a pair of inverse parallel connected switch tubes for connecting a transformer primary to an alternating current line, the control circuit being not responsive to harmonic content or distortion of the line voltage during the connection so that accuracy of the predetermined delayed firing of the switch tubes is maintained during the entire connection.

It is yet another object of this invention to provide a control circuit which may be particularly advantageous for use with an alternating current resistance welding system and that is responsive to permit a welding operation only during an adjustable predetermined number of full cycles of the alternating current passing through the controllable switch tubes to the welding transformer primary so that the total amount of current in the transformer secondary may be accurately predetermined by the delayed firing of the switch tubes during their conductive half-cycles.

It is a further object of this invention to provide a control circuit to permit adjustable and predetermined delayed firing of a pair of switch tubes for connecting a transformer primary to an alternating current line, the control circuit being so arranged as to permit the application of firing impulses to said tubes for a predetermined period of time starting substantially coincident in time with the occurrence of zero line voltage for said alternating current and terminating substantially coincident with the recurrence in time of said zero line voltage condition.

Further objects and advantages of this invention will be apparent upon reference to the following specification and the single figure of the drawing representing a schematic diagram of the control circuit as applied to a resistance welding system of the alternating current type.

Referring to the drawing, the control system of this invention will be described with particular reference to its application to an alternating current resistance welding system. The welding transformer 10 is shown having a secondary winding 11 for connection to the resistance welding load and a primary winding 12 adapted to be connected to a source 14 of alternating current which may be any suitable alternating current line. A pair of inverse parallel connected ignitron tubes 15 and 16 are connected in series with the primary winding 12 and the alternating current source 14. Thyratron tubes 17 and 18 are connected for firing the ignitron tubes 15 and 16, respectively. The plate 19 of thyratron tube 17 is connected to the plate 20 of ignitron 15 while its cathode 21 is connected to the starter electrode 22. Similarly, the plate 23 of thyratron 18 is connected to the plate 24 of ignitron 16 while its cathode 25 is connected to the starter electrode 26. A grid bias rectifying supply, generally shown at 30, is provided for the grid circuit of firing tube 17 while the grid bias rectifying supply, shown at 31, is provided for the grid circuit of firing tube 18. Each of the grid bias supplies 30 and 31 is provided with an alternating current power transformer whose primary winding is connected to the alternating current line 14 and whose secondary winding is connected in series with a rectifying device 32, filter condenser 33, and load resistance 34 in parallel with said condenser 33. The positive terminal of each grid supply 30 and 31 is connected to the respective cathode of firing tubes 17 and 18 while the negative terminals of said grid bias supplies are connected effectively to the control grids 35 and 36, respectively, of firing tubes 17 and 18.

The grid bias supplies 30 and 31 normally prevent firing tubes 17 and 18 from conducting, thus preventing the application of firing impulses to the ignitrons 15 and 16 to cause them to become conductive to connect the primary 12 of welding transformer 10 to the alternating current source 14. In order to overcome the negative bias provided by the bias supplies 30 and 31, secondary windings 37 and 38 of the firing transformer 39 are connected in series with the negative terminal of the respective power supplies 30 and 31 to the control grids of the respective tubes 17 and 18. Firing impulses appearing in the secondary windings 37 and 38 of firing transformer 39 are of sufficient magnitude and of such polarity as to overcome the negative bias normally applied to the firing tubes 17 and 18 in such a manner as to permit these tubes to become alternately conducting for applying alternate firing impulses to ignitrons 15 and 16 such that they will become conductive on their alternate half-cycles to thereby connect the primary 12 to alternating current source 14 in a full wave manner as will be readily understood. The firing impulses are supplied to the primary 40 of transformer 39 and are obtained from a suitable phase-shifting network 51 and peaking transformer 59 to be described hereinafter.

The power transformer 50 of the phase-shifting network 51 is provided with a primary winding 52 connected to the alternating current line 14 and is also provided with a secondary winding 53 across which is connected the phase-shifting network comprising the adjustable resistor 54 and condenser 55. The output of the phase-shifting network appears between the center tap 56 of secondary 53 and the point 57 intermediate adjustable resistor 54 and condenser 55 and is effectively connected to the primary 58 of a peaking transformer 59. A local phase-shifting circuit comprised of condenser 60' and adjustable resistor 61 is inserted in series with the primary 58 of peaking transformer 59 in order that the applied current to the primary 58 will be in phase with the applied voltage appearing across the output terminals 56 and 57 of the phase-shifting network 51. By suitably adjusting the resistor 61 the above result may be obtained with a production type peaking transformer subject to the usual variance of characteristics. By adjusting the amount of resistance of adjustable resistor 54, the amount of phase shift occurring in the main phase shift circuit 51 may be varied to cause the voltage peaks in the peaking transformer secondary 60 to occur at adjustable phase points in respect to the phase of the line voltage 14 and when the voltage peaks from the peaking transformer 59 are applied to the primary 40 of firing transformer 39, the ignitrons 15 and 16 will be rendered conductive substantially with the occurrence of such voltage peaks. Thus, as should be well understood, adustable delayed firing of the ignitrons 15 and 16 is obtained to control the amount of alternating current from the source 14 passed through welding transformer primary 12.

It has been found that when a substantial load or current is drawn by the welding transformer 10, the wave form of the alternating current source 14 will be distorted due to the introduction of harmonic frequencies thereto. This distortion of the waveform would affect the phase-shifting circuit 51 such that the voltage peaks produced in the secondary 60 of the peaking transformer 59 would not occur at the desired predetermined times with respect to the phase of the fundamental frequency of the applied alternating current 14. To prevent the peaking transformer 59 from responding to the distorted output of the phase-shift circuit 51 under such conditions, this invention provides for a series resonant circuit comprised of the inductor 62 and condenser 63 which is tuned to present a relatively low impedance to the fundamental frequency of the alternating current source 14 while presenting a relatively high impedance to the harmonic frequencies of such alternating current line 14. Thus a voltage drop due to harmonic frequencies is produced across the inductor 62 instead of the primary 58 of the peaking transformer 59.

The control system of this invention also provides a means for permitting the connection of the voltage peaks occurring in the secondary winding 60 of peaking transformer 59 to the firing transformer 39 for a predetermined period of time which may further be advantageously designed to start substantially coincident with the occurrence of zero line voltage condition for the alternating current source 14 and stop substantially coincident with the recurrence of such zero line voltage condition. Such means includes a pair of controllable discharge devices 70 and 80 whose plates 71 and 81 are connected to respective ends 72 and 82 of the peaking transformer secondary 60. The center tap 90 of peaking transformer secondary 60 is connected to one end of the primary winding 40 of the firing transformer 39 while the other end of the primary winding 40 is connected to the cathodes 74 and 84, respectively, of discharge devices 70 and 80. Controllable discharge devices 70 and 80 may preferably be of the gaseous type known as thyratrons whose control grids 75 and 85, respectively, when positive in potential with regard to their cathodes 74 and 84, permit them to conduct. A timed square wave generator or voltage pulse generator 100 is employed to provide a voltage pulse having a positive potential to be applied to the control grids 75 and 85 during the pulse duration and to be of negative potential at all other times. The pulse generator may be of a type such as specifically described and claimed in the copending patent application of John W. Dawson and Donald P. Faulk, Serial No. 733,901, filed March 11, 1947. Such pulse generator as described in the copending patent application is provided with a pair of input terminals 101 and 102 connected to the alternating current source 14 and a pair of output terminals 103 and 104 between which normally appears a voltage having a polarity such as to apply a negative potential to the control grids 75 and 85 with respect to the cathodes 74 and 84 of discharge devices 70 and 80. Upon closing the switch 105, the potential appearing between output terminals 103 and 104 is changed to provide a voltage pulse for applying a positive potential to control grids 75 and 85 during the predetermined pulse duration. As described in the copending application, the pulse duration is adjustable and may be predetermined to start substantially coincident with the occurrence of a zero line voltage condition for the alternating current source 14 and to stop substantially coincident with the recurrence of said zero line voltage condition. The application of such voltage pulse to control the conductivities of the translating tubes 70 and 80 is especially advantageous in the control system of this invention when applied to a resistance welding system of the alternating current type using delayed firing of the ignitrons 15 and 16, since it enables an accurate predetermination of the total amount of welding current to be passed through the welding transformer 10.

For a better understanding of the above, consider the operation of the control circuit as applied to a welding system. Adjustable resistor 54 may be varied to predetermine the desired amount of welding heat or current for each half-cycle of line voltage as determined by the delayed firing point for ignitrons 15 and 16 with respect to the phase of the alternating current line 14. Voltage peaks will then appear in the secondary 60 of peaking transformer 59 occurring at the desired firing point for the ignitrons 15 and 16. Upon closing the switch 105, a control voltage pulse of predetermined pulse duration will appear between the output terminals 103 and 104 to permit tubes 70 and 80 to become conductive, thus connecting the voltage peaks in the peaking transformer secondary 60 to the primary of firing transformer 39. In such a manner, the ignitrons 15 and 16 are alternately fired by the voltage peaks occurring in the peaking transformer secondary 60. When the control voltage pulse between output terminals 103 and 104 of the pulse generator 100 is timed to start substantially coincident with the occurrence of zero line voltage for the alternating current source 14 and to stop substantially with the recurrence of such zero line voltage condition, it will be apparent that a predetermined number of full cycles of alternating current 14 will be passed through the primary 12 of welding transformer 10 and that the amount of current conducted during each half-cycle by the ignitrons 15 and 16 may be accurately predetermined in accordance with their delayed firing points as determined by the setting of the phase shift circuit 51. It is, of course, to be unuderstood that the control voltage pulse duration is adjustable to provide a pulse duration equal to the time duration of any number of whole alternating current cycles so that the application of the welding current or heat may be predetermined for such adjustable time periods.

It is to be understood that this invention, in its broadest sense, is not to be limited to the specific translating or gating circuit including thyratrons 70 and 80 for permitting the connection of the voltage peaks from the peaking transformer 59 to the firing transformer 39 since equivalent circuits will readily suggest themselves to those skilled in the art. It should also be understood that any form of control voltage pulse generator may be employed to produce the control voltage having the desired characteristics for permitting the application of the voltage peaks to the firing transformer for predetermined periods of time, the end of which, if desired, may be adjusted to occur coincident with the occurrence and recurrence of certain conditions for the line voltage.

What is claimed is:

1. The system comprising a transformer having a secondary winding for supplying power to a load and a primary winding, means, for connecting said primary winding to a source of alternating current, including a gaseous discharge device having an anode, a cathode and a control electrode, a circuit for generating firing impulses connected to said control electrode, including a transformer having a secondary winding connected to said circuit, and means for connecting a primary winding of said last-named transformer to said alternating current source, through a high impedance to the harmonic frequency content of said source.

2. The system comprising a transformer having a secondary winding for supplying power to a load and a primary winding, means, for connecting said primary winding to a source of alternating current, including a gaseous discharge device having an anode, a cathode and a control electrode, a circuit for generating firing impulses connected to said control electrode, including a peaking transformer having a secondary winding connected to said circuit, and means for connecting a primary winding of said peaking transformer to said alternating current source, through a high impedance to the harmonic frequency content of said source.

3. A system comprising, a transformer having a secondary winding for supplying power to a load and a primary winding, means, for connecting said primary winding to a source of alternating current, including a gaseous discharge device having an anode, a cathode and a control electrode, means including a phase-shifting network connecting said source to the primary winding of a peaking transformer having a secondary winding connected to said circuit, the connections between said network and the primary of said peaking transformer therein a circuit which presents a high impedance to the harmonic frequency content of said source.

4. A system comprising, a transformer having a secondary winding for supplying power to a load and a primary winding, means, for connecting said primary winding to a source of alternating current, including a pair of inverse parallel-connected gaseous discharge devices each of said devices having an anode, a cathode and a control element, means including a phase-shifting network connecting said source to the primary winding of a peaking transformer having a secondary winding connected to said circuit, the connections between said network and the primary of said peaking transformer having therein a circuit which presents a high impedance to the harmonic frequency content of said source.

5. A system comprising, a transformer having a secondary winding for supplying power to a load and a primary winding, means, for connecting said primary winding to a source of alternating current, including a pair of inverse parallel-connected gaseous discharge devices each of said devices having an anode, a cathode and a control element, means including a phase-shifting network connecting said source to the primary winding of a peaking transformer having a secondary winding connected to said circuit, the connections between said network and the primary of said peaking transformer including therein a series resonant circuit tuned to the fundamental frequency and which presents a high impedance to the harmonic frequency content of said source.

6. The system comprising a transformer having a secondary winding for supplying power to a load and a primary winding, means, for connecting said primary winding to a source of alternating current, including a gaseous discharge device having an anode, a cathode and a control electrode, a circuit for generating firing impulses, said circuit including a phase-shifting network connecting said alternating current source to the primary winding of a peaking transformer having a secondary winding across which the firing impulses are generated, the connection between said network and the primary of said peaking transformer having therein a circuit which presents a high impedance to the harmonic frequency content of said source, and switching means for connecting said firing impulses to said device for an adjustable predetermined time.

7. The system comprising, a transformer having a secondary winding for supplying power to a load and a primary winding, means, for connecting said primary winding to a source of alternating current including a gaseous discharge device having an anode, a cathode and a control electrode, a circuit for generating firing impulses for said device including a thyratron controllably fired to permit the connection of said firing impulses to said device, and means for supplying a voltage pulse of adjustable predetermined pulse duration equal to at least a plurality of cycles of said source to the control element of said thyratron to thereby controllably fire said thyratron for a length of time equal to the pulse duration to thereby connect said firing impulses to said device, the voltage on said thyratron control element remaining substantially constant throughout the duration of said pulse.

8. The system comprising, a transformer having a secondary winding for supplying power to a load and a primary winding, means, for connecting said primary winding to a source of alternating current, including a gaseous discharge device having an anode, a cathode and a control electrode, a circuit for generating firing impulses for said device, means including a thyratron controllably fired to permit the connection of said firing impulses to said device, and means for supplying a voltage pulse of adjustable predetermined pulse duration to the control element of said thyratron to permit its conduction for a length of time equal to the pulse duration to thereby connect said firing impulses to said device, said voltage pulse duration being equal to the time duration of a plurality of full cycles of said alternating current, the potential of said thyratron control element remaining substantially constant during said pulse.

9. The system comprising, a transformer having a secondary winding for supplying power to a load and a primary winding, means, for connecting said primary winding to a source of alternating current, including a gaseous discharge device having an anode, a cathode and a control electrode, a circuit for generating firing impulses for said device, means including a thyratron controllably fired to permit the connection of said firing impulses to said device, and means for supplying a voltage pulse of adjustable predetermined pulse duration and substantially constant amplitude to the control element of said thyratron to permit its conduction for a length of time equal to the pulse duration to thereby connect said firing impulses to said device, said voltage pulse being initiated substantially coincident in time with the occurrence of zero voltage for said source and being terminated coincident in time with the recurrence of substantially zero voltage for said source.

10. A system comprising a source of alternating current, a gaseous discharge device having an anode, a cathode, and a control electrode, a circuit connecting said anode and cathode with a load and said source through a high impedance to harmonic frequencies of said source, and a circuit for generating firing impulses connected to said control electrode.

11. A system comprising a source of alternating current, a gaseous discharge device having an anode, a cathode, and a control electrode, a circuit connecting said anode and cathode with a load and said source through a high impedance to harmonic frequencies of said source, and through a phase-shifting network, and a circuit for generating firing impulses connected to said control electrode.

12. A system comprising a source of alternating current, a gaseous discharge device having an anode, a cathode, and a control electrode, a circuit connecting said anode and cathode with a load and said source through a high impedance to harmonic frequencies of said source, a circuit for generating firing impulses connected to said control electrode, said generating circuit being fed by power from said source, and a circuit for introducing a phase shift between power fed to said generating circuit and power fed to said anode-cathode circuit.

13. A system comprising a gaseous discharge device having an anode, a cathode, and a control electrode, a circuit connecting said anode and cathode with a load and a source of alternating current having a high harmonic frequency content, and a circuit for generating firing impulses connected to said control electrode.

14. A system comprising a source of alternating current, a gaseous discharge device having an anode, a cathode, and a control electrode, a circuit connecting said anode and cathode with said load and a source of alternating current comprising a peaking transformer, and a circuit for generating firing impulses connected to said control electrode.

15. A system comprising a gaseous discharge device having an anode, a cathode, and a control electrode, a circuit connecting said anode and cathode with a load and a source of alternating current having a high harmonic frequency content, a circuit for generating firing impulses connected to said control electrode, said generating circuit being fed by power from said source, and a circuit for introducing a phase shift between power fed to said generating circuit and power fed to said anode-cathode circuit.

JOHN W. DAWSON.
DONALD P. FAULK.

REFERENCES CITED

The following references are of record in the file of this patent:

UNITED STATES PATENTS

| Number | Name | Date |
|---|---|---|
| 2,217,476 | Gulliksen et al. | Oct. 8, 1940 |
| 2,277,847 | Dawson | Mar. 31, 1942 |
| 2,289,321 | Collom | July 7, 1942 |
| 2,421,995 | Cooper | June 10, 1943 |
| 2,366,561 | Smidt | Jan. 2, 1945 |
| 2,370,287 | Bivens | Feb. 27, 1945 |
| 2,395,881 | Klemperer | Mar. 5, 1945 |
| 2,372,128 | Smith | Mar. 20, 1945 |

Certificate of Correction

Patent No. 2,499,730                                            March 7, 1950

JOHN W. DAWSON ET AL.

It is hereby certified that errors appear in the printed specification of the above numbered patent requiring correction as follows:

Column 5, line 40, for the word "end" read *ends*; column 6, line 9, after "transformer" insert *having*; line 65, after "current" insert a comma;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*